US011455017B2

(12) United States Patent
Liu

(10) Patent No.: US 11,455,017 B2
(45) Date of Patent: Sep. 27, 2022

(54) HINGE FOR MOBILE TERMINAL HAVING AN INWARDLY BENDABLE FLEXIBLE SCREEN AND MOBILE TERMINAL HAVING AN INWARDLY BENDABLE FLEXIBLE SCREEN

(71) Applicant: HANGZHOU AMPHENOL PHOENIX TELECOM PARTS CO., LTD., Zhejiang (CN)

(72) Inventor: Xiaojie Liu, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 163 days.

(21) Appl. No.: 16/769,370

(22) PCT Filed: Nov. 30, 2018

(86) PCT No.: PCT/CN2018/118400
§ 371 (c)(1),
(2) Date: Jun. 3, 2020

(87) PCT Pub. No.: WO2019/109858
PCT Pub. Date: Jun. 13, 2019

(65) Prior Publication Data
US 2020/0293094 A1     Sep. 17, 2020

(30) Foreign Application Priority Data
Dec. 6, 2017    (CN) .......................... 201721678335.4

(51) Int. Cl.
*G06F 1/16*     (2006.01)
*E05D 3/12*     (2006.01)
(Continued)

(52) U.S. Cl.
CPC ........... *G06F 1/1681* (2013.01); *E05D 3/122* (2013.01); *E05D 11/0054* (2013.01);
(Continued)

(58) Field of Classification Search
CPC ..... G06F 1/1681; G06F 1/1652; H04M 1/026
See application file for complete search history.

(56) References Cited

U.S. PATENT DOCUMENTS 9,348,450 B1 *    5/2016   Kim ....................... G06F 1/1616
10,365,691 B2 *    7/2019   Bae ....................... G06F 1/1652
(Continued)

FOREIGN PATENT DOCUMENTS

CN     205596165 U     9/2016
CN     205978043 U     2/2017
(Continued)

*Primary Examiner* — Anthony Q Edwards
(74) *Attorney, Agent, or Firm* — Muncy, Geissler, Olds & Lowe, P.C.

(57) ABSTRACT

A hinge for a mobile terminal having an inwardly bendable flexible screen comprises: a three-member mechanism consisting of a left supporting plate, a middle supporting plate and a right supporting plate which are rotatably and sequentially connected; a left supporting frame; a right supporting frame; and a middle U-shaped outer cover. Both ends of the three-member mechanism are free ends, such that the left supporting plate, the middle supporting plate and the right supporting plate are flexible screen supporting members capable of moving up and down. After moving up, the left supporting plate, the middle supporting plate and the right supporting plate form a flexible screen supporting face, and after moving down, the components are in a bent state, thereby providing a space for bending of the flexible screen. After moving down, the middle supporting plate reaches a bottom portion of the middle U-shaped outer cover. The present invention can provide a larger space for bending of the flexible screen such that the middle mechanism of the (Continued)

hinge is not exposed after folded, and it can be used in mobile terminals such as mobile phones, e-books, and computers, enabling the mobile terminal to achieve large-screen display in a small volume.

5 Claims, 5 Drawing Sheets

(51) Int. Cl.
   *E05D 11/00*  (2006.01)
   *H04M 1/02*  (2006.01)
(52) U.S. Cl.
   CPC .......... *G06F 1/1626* (2013.01); *G06F 1/1652* (2013.01); *H04M 1/0216* (2013.01); *H04M 1/0268* (2013.01); *E05Y 2201/11* (2013.01); *E05Y 2900/606* (2013.01)

(56) References Cited

U.S. PATENT DOCUMENTS

| | | | |
|---|---|---|---|
| 2013/0021762 A1* | 1/2013 | van Dijk | H04M 1/022 |
| | | | 361/749 |
| 2014/0042293 A1* | 2/2014 | Mok | H04M 1/0216 |
| | | | 248/682 |
| 2015/0378397 A1* | 12/2015 | Park | G06F 1/1635 |
| | | | 361/679.27 |
| 2016/0302314 A1* | 10/2016 | Bae | G06F 1/1616 |
| 2017/0115701 A1* | 4/2017 | Bae | G06F 1/16 |
| 2020/0137907 A1* | 4/2020 | Kang | H05K 5/0017 |

FOREIGN PATENT DOCUMENTS

| | | |
|---|---|---|
| CN | 106601130 A | 4/2017 |
| CN | 207777905 U | 8/2018 |
| KR | 10-1331206 B1 | 11/2013 |

* cited by examiner

HINGE FOR MOBILE TERMINAL HAVING AN INWARDLY BENDABLE FLEXIBLE SCREEN AND MOBILE TERMINAL HAVING AN INWARDLY BENDABLE FLEXIBLE SCREEN

FIELD OF THE INVENTION

The present invention relates to a mobile terminal and a hinge thereof.

BACKGROUND

Flexible screen is an emerging screen. For the mechanical structure of a mobile terminal having a flexible screen, what needs to be solved is how to support the flexible screen to meet the characteristics of bending required by the flexible screen when the mobile terminal is folded such that the flexible screen can be applied to the mobile terminal.

SUMMARY

An object of the present invention is to provide a hinge for a mobile terminal having an inwardly bendable flexible screen which has a simple structure and can be used as a hinge for a mobile terminal with a flexible screen inside. To achieve this object, the present invention adopts the following technical solutions:

A hinge for a mobile terminal having an inwardly bendable flexible screen, comprising a three-member mechanism consisting of a left supporting plate, a middle supporting plate and a right supporting plate which are rotatably and sequentially connected, a left supporting frame and a right supporting frame, both ends of the three-member mechanism are free ends, such that the left supporting plate, the middle supporting plate and the right supporting plate are flexible screen supporting members capable of moving up and down, after moving up, the left supporting plate, the middle supporting plate and the right supporting plate form a flexible screen supporting face, and after moving down, the components are in a bent state, thereby providing a space for bending of the flexible screen; the inner ends of the left supporting frame and the right supporting frame are rotatably connected to a synchronization mechanism, respectively, such that the left supporting frame and the right supporting frame can rotate synchronously and reversely;

The eccentric positions of the inner ends of the left supporting frame and the right supporting frame are connected with the gap between the middle supporting plate and the left supporting plate and the right supporting plate at the rotatable connection respectively, the outer ends of the left supporting plate and right supporting plate are movably connected to the left supporting frame and the right supporting frame respectively, and a movable guiding mechanism is provided therebetween, such that the outer ends can be moved up and down under the guidance of the guiding mechanism;

The hinge is further provided with a middle U-shaped outer cover, the position of the middle supporting plate corresponds to the middle U-shaped outer cover, after moving down, the middle supporting plate reaches a bottom portion of the middle U-shaped outer cover.

Further, a pair of left supporting frames and a pair of right supporting frames are provided, and the pair of left supporting frames are on both sides of the left supporting plate respectively, and the pair of right supporting frames are on both sides of the right supporting plate respectively.

Further, the eccentric positions of the inner ends of the left supporting frame and the right supporting frame are symmetrically provided with connecting shafts, and the middle supporting plate is symmetrically provided with a slot hole mating with the connecting shaft of the left supporting frame and a slot hole mating with the connecting shaft of the right supporting frame.

Further, the guiding mechanism is a guide groove arranged on the left supporting frame and the right supporting frame and a guide pin arranged on the left supporting plate and the right supporting plate, and the guide grooves on the left supporting frame and the right supporting frame are symmetrically arranged.

Further, the hinge is provided with a mounting shell on the outside the left supporting frame and the right supporting frame, and a synchronization mechanism is mounted in the mounting shell, both ends of the middle U-shaped outer cover are connected to the mounting shell on both sides respectively, and the left supporting frame and the right supporting frame are provided with a relief hole to make the connecting structure between the middle U-shaped outer cover and the mounting shell to move and rotate the left supporting frame and the right supporting frame.

Another object of the present invention is to provide a mobile terminal having an inwardly bendable flexible screen using the above hinge. To achieve the object, the present invention adopts the following technical solutions:

A mobile terminal having an inwardly bendable flexible screen, wherein the mobile terminal is provided with any one of the hinges described above, and the flexible screen is laid on the inside of the hinge.

The present invention has a simple and reliable structure, and can support the inner flexible screen and meet the needs of bending the inner flexible screen when it is folded, and provide a larger space for bending of the flexible screen such that the middle mechanism of the hinge is not exposed after folded. When the hinge of the present invention is applied to mobile terminals such as mobile phones, e-books and computers, etc., it can be used as both a hinge and a flexible screen supporting structure therein. When the mobile phones and computers are unfolded and folded, the flexible screen can expand and bend freely, such that the flexible screen can be used in mobile terminals such as mobile phones, e-books, and computers, enabling the mobile terminal to achieve large-screen display in a small volume.

DETAILED DESCRIPTION

Figure 1:
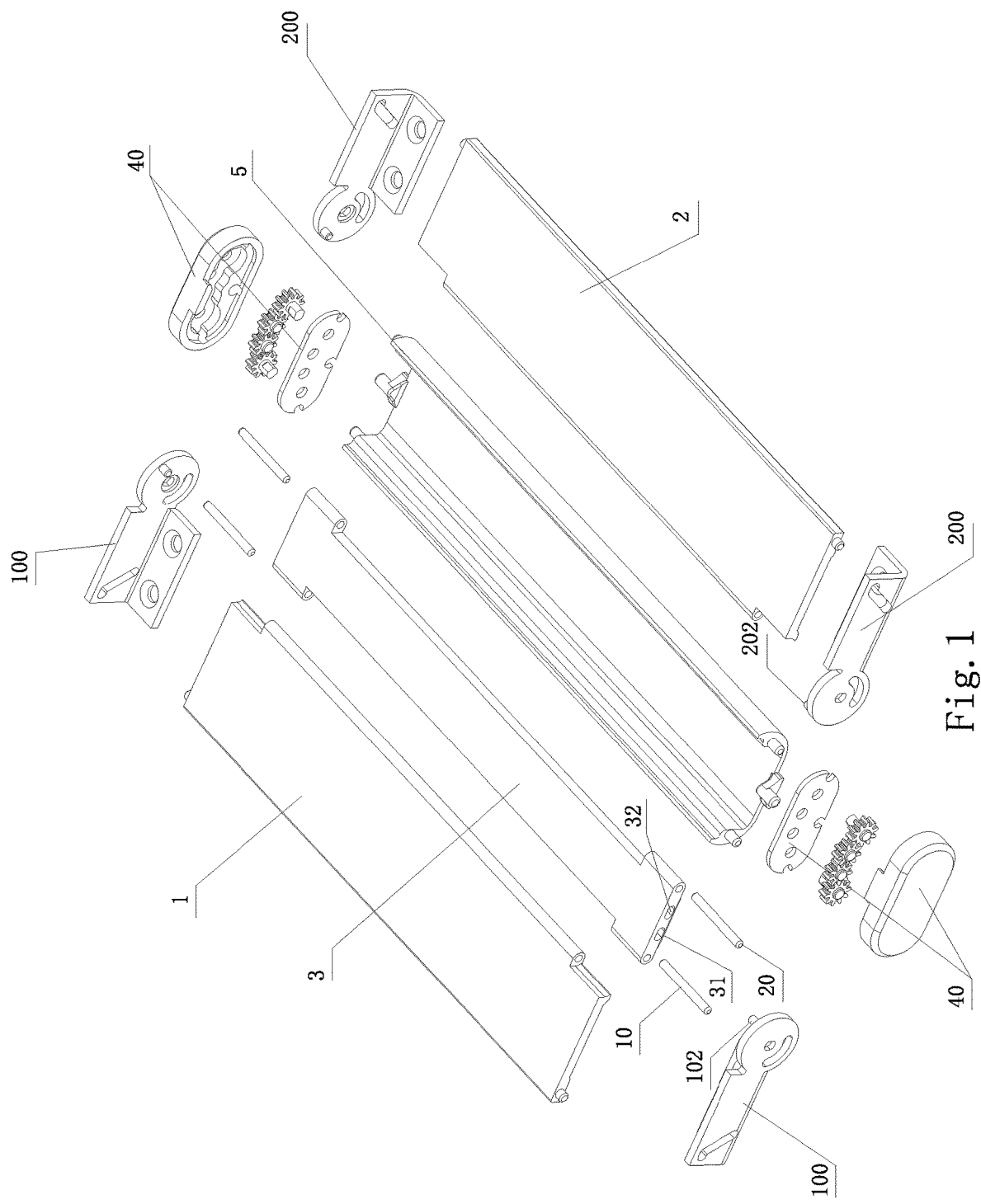
FIG. 1 is an exploded view of the hinge embodiment of the present invention.
Figure 2:
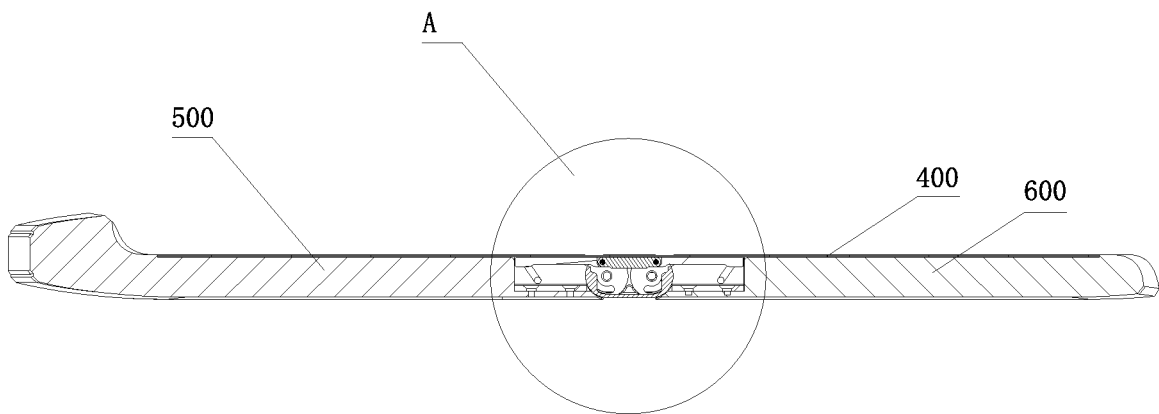
FIG. 2 is a cross-sectional view of the hinge embodiment of the present invention in an unfolded state.
Figure 3:
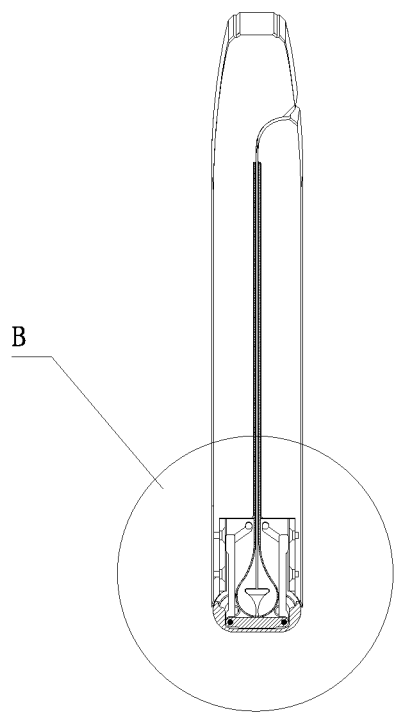
FIG. 3 is a cross-sectional view of the hinge embodiment of the present invention in a folded state.
Figure 4:
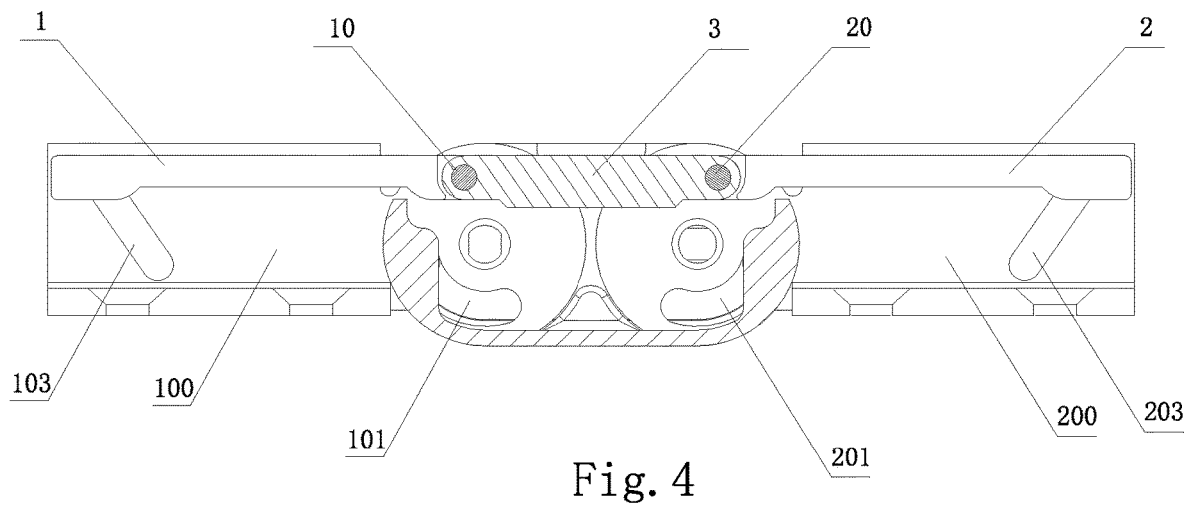
FIG. 4 is an enlarged view of part A in FIG. 2.
Figure 5:
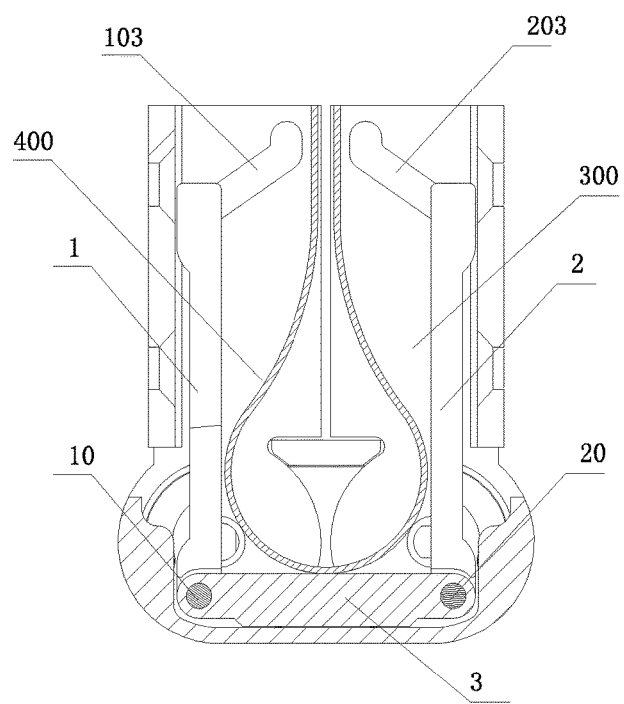
FIG. 5 is an enlarged view of part B in FIG. 3.
Figure 6:
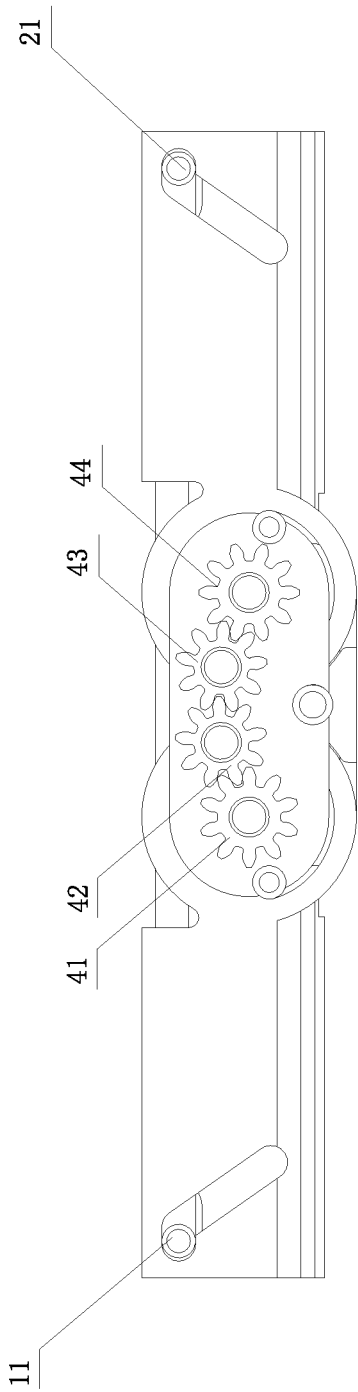
FIG. 6 is a partial cross-sectional view of the hinge embodiment of the present invention in an unfolded state, showing the structure of the synchronization mechanism.
Figure 7:
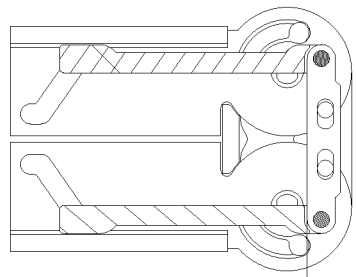
FIG. 7 is a schematic diagram demonstrating the state change from unfolding to folding of the hinge embodiment of the present invention.
Figure 7:
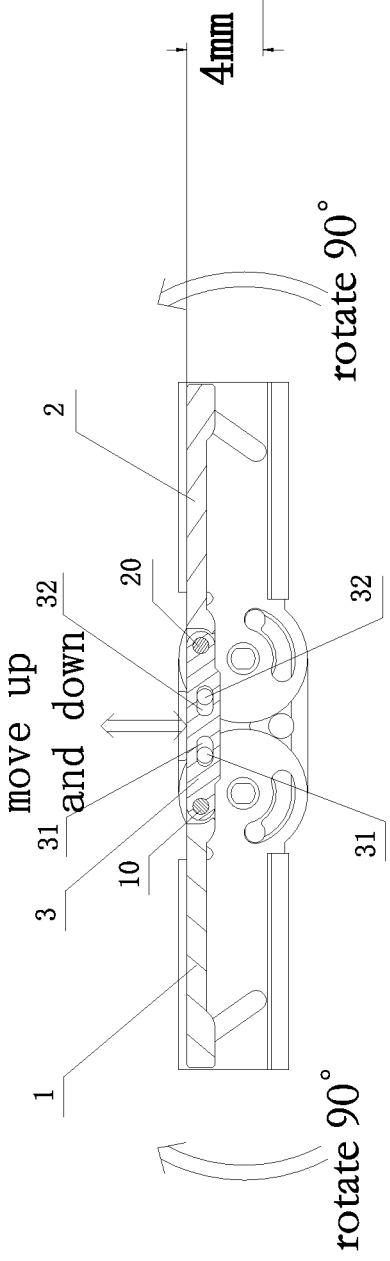
Figure 8:
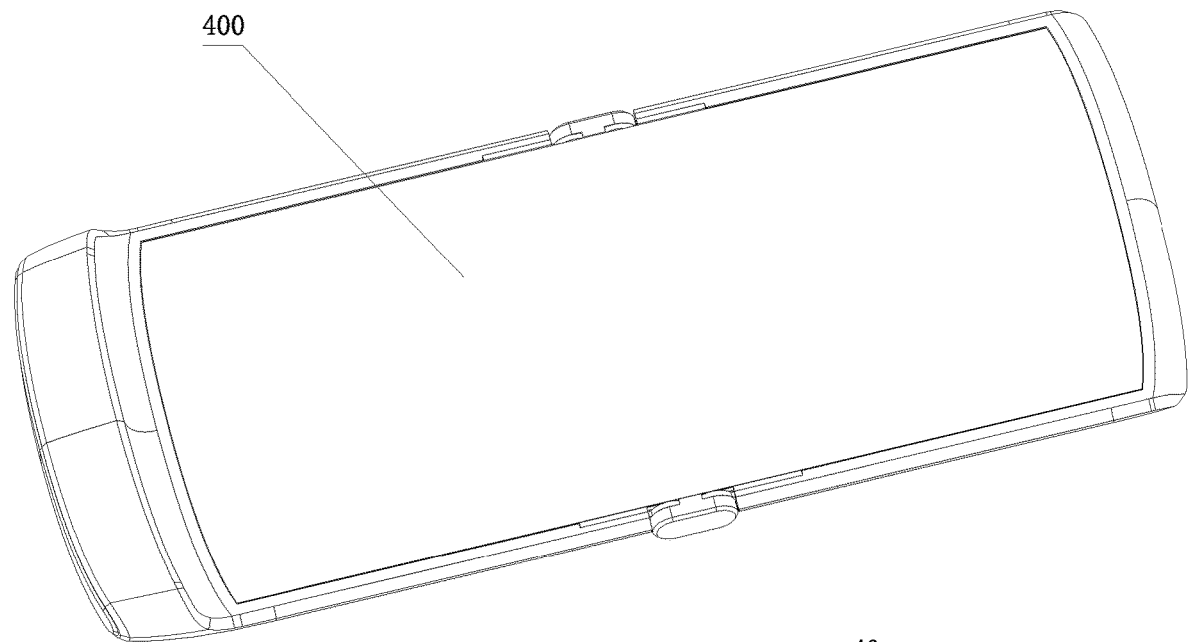
FIG. 8 is a schematic diagram of the hinge in an unfolded state when applied to a mobile terminal of the present invention.
Figure 9:
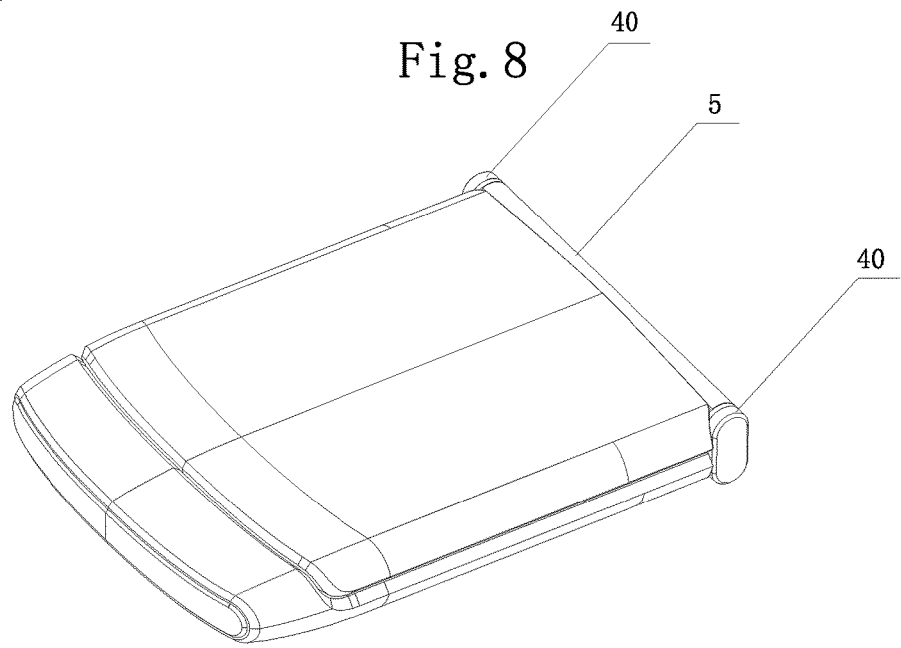
FIG. 9 is a schematic diagram of the hinge in a folded state when applied to a mobile terminal of the present invention.

Referring to the accompanying figures, a hinge for a mobile terminal having an inwardly bendable flexible screen comprises a three-member mechanism consisting of a left supporting plate 1, a middle supporting plate 3 and a right supporting plate 2 which are rotatably and sequentially connected. Both ends of the three-member mechanism are free ends, such that the left supporting plate, the middle supporting plate and the right supporting plate are flexible screen supporting members capable of moving up and down. After moving up, the left supporting plate, the middle supporting plate and the right supporting plate form a flexible screen supporting face, after moving down, the components are in a bent state, thereby providing a space for bending of the flexible screen. The reference numeral 10 is a rotatable connecting shaft of the left supporting plate 1 and the middle supporting plate 3, and the reference numeral 20 is a rotatable connecting shaft of the right supporting plate 2 and the middle supporting plate 3.

The hinge is further provided with a middle U-shaped outer cover 5, the position of the middle supporting plate 3 corresponds to the middle U-shaped outer cover 5. After moving down, the middle supporting plate 3 reaches a bottom portion of the middle U-shaped outer cover 5.

The hinge is provided with a pair of left supporting frames 100 and a pair of right supporting frames 200, and the pair of left supporting frames 100 are on both sides of the left supporting plate 1 respectively, and the pair of right supporting frames 200 are on both sides of the right supporting plate 2 respectively.

The inner ends of the left supporting frame 100 and the right supporting frame 200 are rotatably connected to the synchronization mechanism respectively, such that the left supporting frame 100 and the right supporting frame 200 can rotate synchronously and reversely. The synchronization mechanism may be a gear mechanism, and the gear mechanism may include gears 41, 42, 43, 44 that are engaged in sequence. The parameters of the gear can be designed to be symmetrical or asymmetrical according to the design requirements of hinge unfolding. The gear 41 and the gear 44 are connected to the inside ends of the left supporting frame 100 and the right supporting frame 200, respectively.

The hinge is provided with a mounting shell 40 on the outside the left supporting frame 100 and the right supporting frame 200, and the gears 41, 42, 43, 44 are mounted in the mounting shell 40, and both ends of the middle U-shaped outer cover 5 are connected to the mounting shell 40 on the side respectively. The left supporting frame 100 and the right supporting frame 200 are provided with relief holes 101 and 201 to make the connecting structure between the middle U-shaped outer cover and the mounting shell to move and rotate the left supporting frame and the right supporting frame.

Both ends of the three-member mechanism are free ends, such that the left supporting plate 1, the middle supporting plate 3 and the right supporting plate 2 are flexible screen supporting members capable of moving up and down;

The eccentric positions (that is, offset from the center of rotation) of the inner ends of the left supporting frame 100 and the right supporting frame 200 are connected with the gap between the middle supporting plate 3 and the left supporting plate 1 and the right supporting plate 2 at the rotatable connection respectively. The eccentric positions of the inner ends of the left supporting frame and the right supporting frame are symmetrically provided with connecting shafts 102, 202, and the middle supporting plate 3 is symmetrically provided with a slot hole 31 mating with the connecting shaft 102 of the left supporting frame and a slot hole 32 mating with the connecting shaft 202 of the right supporting frame. The outer ends of the left supporting plate 1 and right supporting plate 2 are movably connected to the left supporting frame 100 and the right supporting frame 200 respectively, and a movable guiding mechanism is provided therebetween. The guiding mechanisms are guide grooves 103, 203 arranged on the left supporting frame 100 and the right supporting frame 200 and guide pins 11, 21 arranged on the left supporting plate 1 and the right supporting plate 2, and the guide grooves 103, 203 on the left supporting frame 100 and the right supporting frame 200 are symmetrically arranged. During the unfolding and folding of the hinge, the left supporting plate 1 and the right supporting plate 2 can rotate synchronously with respect to the middle supporting plate, and move up and down synchronously with respect to the thickness direction of the mobile terminal, while the middle supporting plate 3 can move in and out with respect to the width direction of the hinge, to provide a larger space for bending of the flexible screen 400 when the hinge is folded and provide support of the flexible screen when the hinge is unfolded.

A torque mechanism can be provided between the left supporting frame and the synchronization mechanism and between the right supporting frame and the synchronization mechanism to improve the operating feel and provide functions of stop and positioning at any time. The torsion mechanism may also be provided between other parts where relative rotation occurs.

For the mobile terminal using the above hinge, taking a mobile phone as an example, the flexible screen 400 is laid on the inner side of the hinge and the inner side of the left main supporting plate 500 and the right main supporting plate 600 of the flexible screen, and the left supporting frame 100 and the right supporting frame 200 may be integrated with the left main supporting plate 500 and the right main supporting plate 600 of the flexible screen of the mobile terminal, or may be separate components and fixed integrally as a whole.

The foregoing description only presents specific embodiments of the present invention, but the structural features of the present invention are not limited thereto. Any changes or modifications made by those skilled in the art within the field of the present invention shall fall into the scope of protection of the present invention.

The invention claimed is:

1. A hinge for a mobile terminal having an inwardly bendable flexible screen, comprising a three-member mechanism consisting of a left supporting plate, a middle supporting plate and a right supporting plate which are rotatably and sequentially connected, a left supporting frame and a right supporting frame, both ends of the three-member mechanism are free ends, such that the left supporting plate, the middle supporting plate and the right supporting plate are flexible screen supporting members capable of moving up and down, after moving up, the left supporting plate, the middle supporting plate and the right supporting plate form a flexible screen supporting face, and after moving down, the left supporting plate, the middle supporting plate and the right supporting plate are in a bent state, thereby providing a space for bending of the flexible screen; inner ends of the left supporting frame and the right supporting frame are rotatably connected to a synchronization mechanism, respectively, such that the left supporting frame and the right supporting frame can rotate synchronously and reversely;

eccentric positions of the inner ends of the left supporting frame and the right supporting frame are connected with the space between the middle supporting plate and the left supporting plate and the right supporting plate at the rotatable connection respectively, outer ends of the left supporting plate and the right supporting plate are movably connected to the left supporting frame and the right supporting frame respectively, and a movable guiding mechanism is provided therebetween, such that the outer ends can be moved up and down under guidance of the guiding mechanism;

the hinge is further provided with a middle U-shaped outer cover, a position of the middle supporting plate corresponds to the middle U-shaped outer cover, after moving down, the middle supporting plate reaches a bottom portion of the middle U-shaped outer cover, wherein the eccentric positions of the inner ends of the left supporting frame and the right supporting frame are symmetrically provided with connecting shafts, and the middle supporting plate is symmetrically provided with a slot hole mating with the connecting shaft of the left supporting frame and the slot hole mating with the connecting shaft of the right supporting frame.

2. The hinge for a mobile terminal having an inwardly bendable flexible screen according to claim 1, wherein a pair of left supporting frames and a pair of right supporting frames are provided, and the pair of left supporting frames are on both sides of the left supporting plate respectively, and the pair of right supporting frames are on both sides of the right supporting plate respectively.

3. The hinge for a mobile terminal having an inwardly bendable flexible screen according to claim 1, wherein the guiding mechanism is a guide groove arranged on the left supporting frame and the right supporting frame and a guide pin arranged on the left supporting plate and the right supporting plate, and the guide grooves on the left supporting frame and the right supporting frame are symmetrically arranged.

4. The hinge for a mobile terminal having an inwardly bendable flexible screen according to claim 2, wherein the hinge is provided with a mounting shell on an outside of the left supporting frame and the right supporting frame, and a synchronization mechanism is mounted in the mounting shell, both ends of the middle U-shaped outer cover are connected to the mounting shell on both sides respectively, and the left supporting frame and the right supporting frame are provided with a relief hole to make a connecting structure between the middle U-shaped outer cover and the mounting shell to move and rotate the left supporting frame and the right supporting frame.

5. A mobile terminal having an inwardly bendable flexible screen, wherein the mobile terminal is provided with the hinge of claim 1, and the flexible screen is laid on an inner side of the hinge.

* * * * *